(12) United States Patent
Berenstein et al.

(10) Patent No.: US 7,384,591 B2
(45) Date of Patent: Jun. 10, 2008

(54) METHOD FOR PRODUCING ABRASIVE NON-WOVEN CLOTH

(75) Inventors: Yuval Berenstein, Yokneam (IL); Michael Shvartzman, Givat Avni (IL); Nachmi Segal, Kibbutz Shamir (IL)

(73) Assignee: N.R. Spuntech Industries Ltd., Upper Tiberias (IL)

( * ) Notice: Subject to any disclaimer, the term of this patent is extended or adjusted under 35 U.S.C. 154(b) by 0 days.

(21) Appl. No.: 10/825,287

(22) Filed: Apr. 16, 2004

(65) Prior Publication Data

US 2005/0101215 A1 May 12, 2005

(30) Foreign Application Priority Data

Nov. 6, 2003 (IL) ........................................ 158781

(51) Int. Cl.
*D04H 1/46* (2006.01)
(52) U.S. Cl. ..................... 264/557; 28/104; 264/103; 264/167; 264/234; 264/284
(58) Field of Classification Search ................ 264/103, 264/167, 210.2, 211.2, 234, 284, 500, 504, 264/546, 557; 28/104
See application file for complete search history.

(56) References Cited

U.S. PATENT DOCUMENTS

| 5,674,591 | A | 10/1997 | James et al. |
| 5,786,065 | A | 7/1998 | Annis et al. |
| RE38,505 | E | 4/2004 | James et al. |
| 7,037,866 | B2* | 5/2006 | Michaud .................. 28/104 X |
| 2004/0115431 | A1* | 6/2004 | Chen et al. ................. 428/373 |
| 2005/0136772 | A1* | 6/2005 | Chen et al. ................. 442/381 |

FOREIGN PATENT DOCUMENTS

EP 0705932 4/1996

* cited by examiner

*Primary Examiner*—Leo B. Tentoni
(74) *Attorney, Agent, or Firm*—Mark M. Friedman (57) ABSTRACT

A method for producing abrasive non-woven cloth includes forming a non-woven web of fibers including a first layer adjacent to a first surface of the web containing at least about 5% by weight of thermoplastic fibers. The web is patterned to generate raised regions and lowered regions in the first surface, and then heat treated to cause at least part of the thermoplastic fibers to form nodules, thereby imparting abrasive properties to at least the raised regions of the first surface. The non-woven web preferably includes a second layer adjacent to a second surface of the web made up primarily of fibers which do not form nodules under the heat treatment.

15 Claims, 6 Drawing Sheets

METHOD FOR PRODUCING ABRASIVE NON-WOVEN CLOTH

FIELD AND BACKGROUND OF THE INVENTION

The present invention relates to non-woven cloth products and, in particular, it concerns a method for producing abrasive non-woven cloth, and the cloth resulting from this method.

Non-woven cloth (fabric) is used for an ever-growing range of products and applications. In particular, the constant trend towards use of disposable products has lead to huge growth in the market for non-woven materials, and has seen non-woven cloths being adapted as a cost-effective basis for many new products.

Types of non-woven cloth may be classified in many ways, for example, according to the type and gauge of fibers used, the laying technique for forming a web, or the linking technique for uniting the fibers into a cloth. Examples of classes of cloth production techniques to which the present invention is believed to be applicable include, but are not limited to, hotmelt, wet-laid and dry-laid water entanglement, thermo-bonding, air-through thermo-bonding and chemical bonding.

For certain applications, it is desirable to provide various degrees of abrasivity to non-woven cloth. This ranges from very mild abrasive properties used for facial cleansing or skin treatment through to highly abrasive scouring pads used for cleaning kitchen utensils. The required abrasive properties are generally achieved by use of thick gauge fibers which inherently exhibit the required abrasivity.

U.S. Pat. No. 5,786,065 to Annis et al. describes a process for producing an abrasive non-woven material from an initially non-abrasive precursor by heating the cloth which includes between 10% and 50% by weight of thermoplastic fibers to near the melting point of the thermoplastic fibers so that they contract to form nodules. These nodules impart abrasive properties to one planar surface of the material. Differential properties between the two surfaces is achieved by ensuring a gradient in the proportion of the thermoplastic fibers through the initial cloth.

According to the teachings of Annis et al., the abrasivity is a function of the size of the nodules which is, itself, a function of the gauge of thermoplastic fibers used in the precursor material. From the examples quoted, Annis et al. implies that effective high abrasivity may be achieved by using fiber size in the range of 10-55 denier, corresponding to about 11-60 grams per 10,000 meters length of fiber (referred to as "decitex" or "d-tex"). This thickness of fiber necessarily imparts a noticeable coarseness and, after heat treatment, a degree of stiffness to the resulting cloth. In all cases, the surfaces of the material are clearly stated to be planar.

There is therefore a need for a production method and corresponding product which would provide a controllable degree of abrasivity of a non-woven cloth using low-gauge fibers and while maintaining a high degree of flexibility in the cloth.

SUMMARY OF THE INVENTION

The present invention is a method for producing abrasive non-woven cloth, and the cloth resulting from this method.

According to the teachings of the present invention there is provided, a method for producing abrasive non-woven cloth comprising: (a) forming a non-woven web of fibers including at least a first layer adjacent to a first surface of the web containing at least about 5% by weight of thermoplastic fibers; (b) patterning the web so as to generate a pattern of raised regions and lowered regions in the first surface; and (c) performing heat treatment on the web sufficient to cause at least part of the thermoplastic fibers to undergo changes in physical morphology, thereby imparting abrasive properties to at least the raised regions of the first surface.

According to a further feature of the present invention, the non-woven web is implemented so as to include at least a second layer adjacent to a second surface of the web, the second layer containing primarily fibers which do not undergo changes in physical morphology under the heat treatment.

According to a further feature of the present invention, the patterning is implemented so as to cause migration of at least a proportion of fibers within the first layer from the lowered regions to the raised regions.

According to a further feature of the present invention, the patterning is implemented so as to cause migration of a majority of fibers making up the first layer in the lowered regions to the raised regions.

According to a further feature of the present invention, the patterning is implemented by use of water jets to displace fibers.

According to a further feature of the present invention, the water jets are directed towards a portion of the web passing over a cylinder with a perforated surface.

According to a further feature of the present invention, the water jets are directed towards a portion of the web passing over a cylinder with a netting surface.

According to a further feature of the present invention, the water jets are directed towards a portion of the web passing along a patterned conveyor belt.

According to a further feature of the present invention, there is also provided a step of employing water jets to cause entanglement of fibers in the web.

According to a further feature of the present invention, the patterning is implemented such that the raised regions include a plurality of isolated projecting features surrounded by the lowered regions.

According to a further feature of the present invention, the patterning is implemented such that the raised regions include a plurality of elongated ridges.

According to a further feature of the present invention, the thermoplastic fibers have a weight of no more than about 4.5 grams per 10,000 meters, and preferably no more than about 2.2 grams per 10,000 meters.

According to a further feature of the present invention, the first layer contains at least about 10% by weight of the thermoplastic fibers.

According to certain implementations of the present invention, the first layer contains less than about 50% by weight of the thermoplastic fibers. In alternative implementations, it is preferable that the first layer contain more than about 50% by weight of the thermoplastic fibers.

There is also provided according to the teachings of the present invention, an abrasive non-woven cloth comprising at least a first layer of fibers adjacent to a first surface of the cloth, the first layer containing at least about 5% by weight of thermoplastic fibers heat treated so as to include a plurality of nodules, the first layer being patterned such that the first surface exhibits a pattern of raised regions and lowered regions.

According to a further feature of the present invention, there is also provided at least a second layer of fibers adjacent to a second surface of the cloth, wherein the plurality of nodules are substantially only in the first layer.

According to a further feature of the present invention, a majority of material from the first layer is located within the raised regions.

According to a further feature of the present invention, the cloth is formed from a water entanglement process.

According to a further feature of the present invention, the raised regions include a plurality of isolated projecting features surrounded by the lowered regions.

According to a further feature of the present invention, the raised regions include a plurality of elongated ridges.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a method for producing abrasive non-woven cloth, and the cloth resulting from this method.

The principles and operation of production methods and corresponding products according to the present invention may be better understood with reference to the drawings and the accompanying description.

Figure 1A:
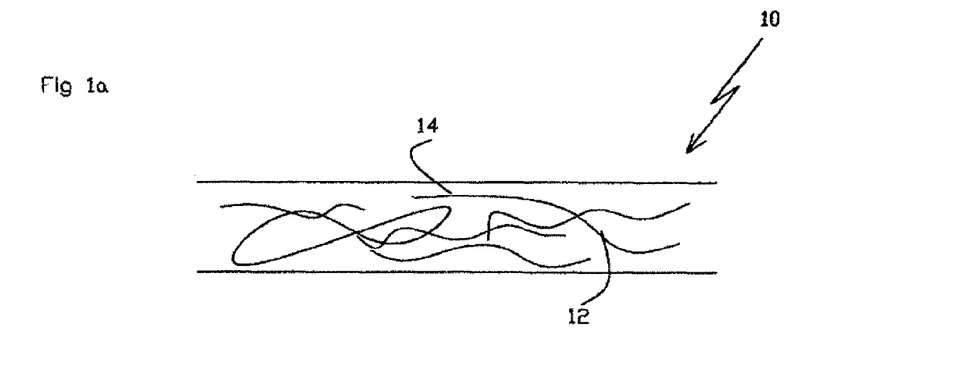
FIGS. 1A-1C are schematic cross-sectional views illustrating stages in production of a first implementation of an abrasive cloth according to the teachings of the present invention.
Figure 1B:
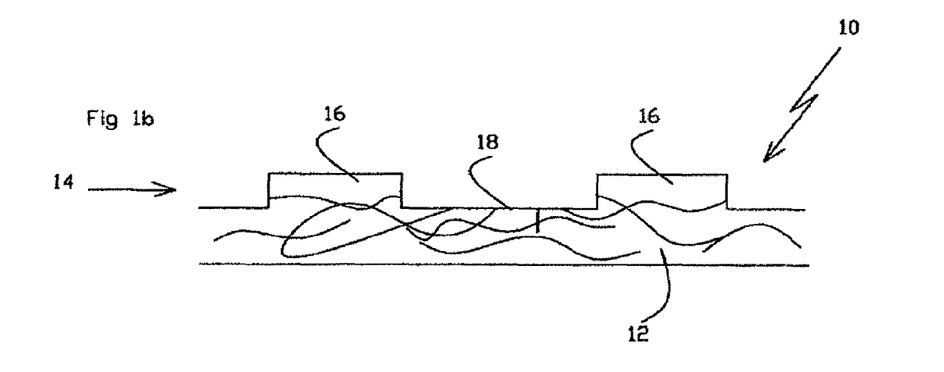
Figure 1C:
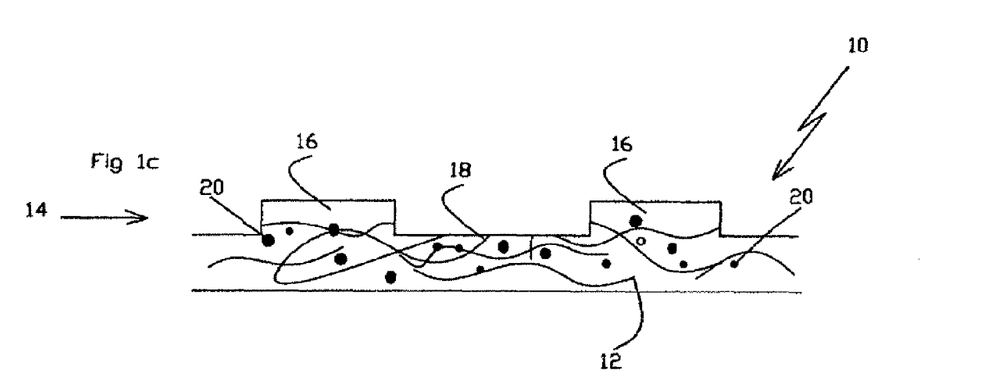
Figures 2A, 2B:
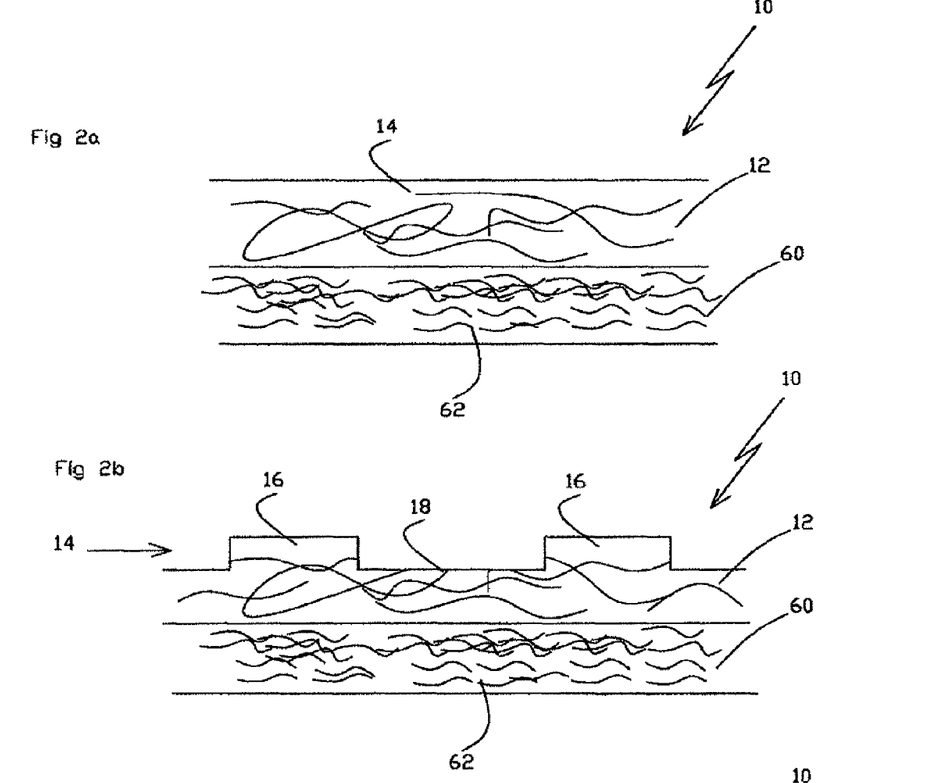
FIGS. 2A-2C are schematic cross-sectional views illustrating stages in production of a second implementation of an abrasive cloth according to the teachings of the present invention.

Referring now to the drawings, FIGS. 1A-1C and FIGS. 2A-2C illustrate various stages during two implementations of a method for producing abrasive non-woven cloth according to the teachings of the present invention in single-layer and multiple-layer implementations, respectively. Referring generically to both implementations in general terms, the method requires forming a non-woven web of fibers 10 (FIGS. 1A and 2A) including at least a first layer 12 adjacent to a first surface 14 of the web, where layer 12 contains between about 5% and 100% by weight (preferably at least 10%) of thermoplastic fibers. Web 10 is then patterned so as to generate a pattern of raised regions 16 and lowered regions 18 in first surface 14 (FIGS. 1B and 2B). A heat treatment is then performed on web 10 so as to cause at least part of the thermoplastic fibers to undergo changes in physical morphology, for example forming nodules 20 (FIGS. 1C and 2C), thereby imparting abrasive properties to at least the raised regions 16 of first surface 14.

It should be appreciated that the method of the present invention and the resulting product provide distinct advantages over the method and product proposed by the aforementioned Annis et al. reference. By using patterning to ensure a desired surface topography of the cloth, the level of abrasivity may be controlled independent of the particle size of the nodules. Specifically, in Annis et al. abrasivity results from nodules which are adjacent to the planar surface of the cloth and varies as a function of size of the nodules which, in turn, is a function largely of the initial fiber size. In contrast, the texture of the product of the present invention provides an extra degree of freedom to adjust the abrasivity of the product, similar to the ridges of a metal file which produce an effective abrasivity much greater than that of a smooth surface of similar material. As a result, fine thermoplastic fibers of d-tex no more than 4.5, and more preferably no more than 2.2, can be used, thereby avoiding the coarseness and stiffness which results from the use of larger gauge fibers. This and other advantages of the present invention will be better understood by reference to the following detailed description.

Before addressing the features of preferred implementations of the present invention in more detail, it will be useful to define certain terminology as used herein in the description and claims. Firstly, the term "thermoplastic" is used herein in the description and claims to refer to any polymer which flows on the application of heat. Preferably, the present invention is implemented with thermoplastics having a crystalline fraction when they are at a temperature below their characteristic melting point, i.e. where sections of the polymers' chains fold in an orderly pattern. Examples of crystalline polymers useful for implementing the present invention include, but are not limited to, polypropylene, polyethylene, polyester terephthalate, and polyamides. A most preferred example is polypropylene. In certain cases, amorphous polymers (i.e., that do not have a crystalline fraction) may also be used.

Reference may also be made to a "polymer transition temperature" of the thermoplastic material as a point of reference in defining the heat treatment performed according to the teachings of the present invention. In the case of a polymer with a crystalline fraction, the melting point is typically used as the point of reference. For amorphous polymers, the glass transition point may be used as the point of reference. In both cases, the reference point will be referred to generically as the "transition temperature" of the polymer.

The term "nodule" is used to refer to agglomerations of thermoplastic material caused by the heat treatment of the present invention such that the minimum dimension of the "nodule" is significantly greater than the diameter of the original fibers. It should be noted that the "nodules" do not need to be of any particular shape, and may in fact be complex interconnected masses formed from partial or total conglomeration of a plurality of fibers.

When referring to the gauge of fibers in fabric production, reference is made variously to scales of "d-tex" or "decitex"

and to "denier". Decitex or d-tex is defined as the weight in grams of 10,000 meters of a fiber. Denier is defined as the weight in grams of 10,000 yards (about 9,000 meters) of a fiber, and is therefore related by a ratio of about 9:10 to the d-tex value.

When referring to the composition of the various layers of fibers according to the present invention, reference is made to "percentage by weight" of the various fibers. It should be noted that the percentage by weight of thermoplastic fibers in layer 12 is calculated according to the initial fiber mix used for that individual layer. Although, after heat treatment, a proportion of the fibers have been converted into nodules or otherwise conglomerated such that they are no longer "fibers", the weight of the nodules is still taken into account when referring to the composition of the corresponding layer in the final product.

Turning now to the features of the present invention in more detail, it should be noted that the present invention is applicable to a wide range of types of non-woven fabric production techniques. By way of a non-limiting particularly preferred example, the invention will be illustrated in the context of a dry-laid water-entanglement production technique. Thus, FIG. 3 shows schematically a production line for dry-laid water-entanglement production of non-woven cloth modified for implementing the method of the present invention.

Figure 3:
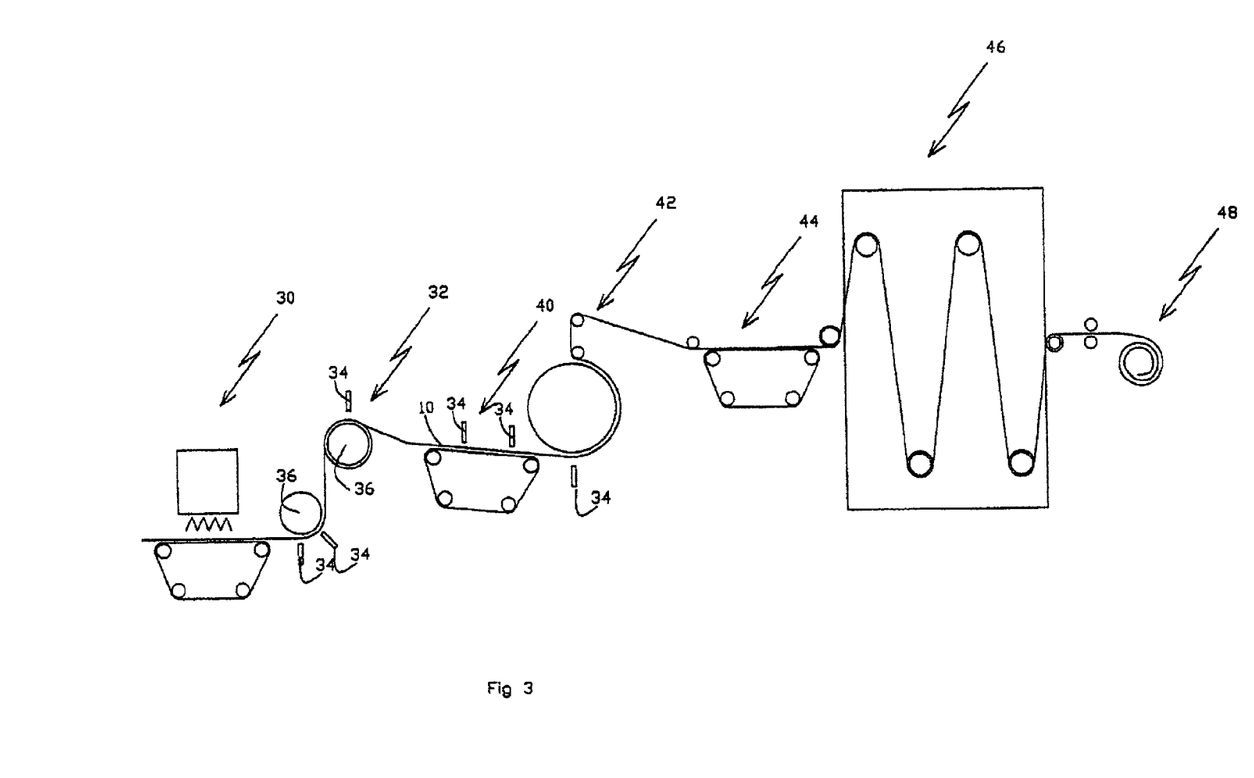
FIG. 3 is a schematic side view of a production line for implementing the method of the present invention.

Specifically, FIG. 3 shows schematically a feed system 30 for supplying one or more layer of fibers to a water entanglement bonding system 32 with water jet nozzle arrangements 34 facing rotating cylindrical screens 36 under which lie one or more suction boxes (details not shown). These systems together produce a bonded cloth web corresponding to web 10 of FIG. 1A or 2A. Both feed system 30 and water entanglement bonding system 32 include many details not shown here, including devices for fiber opening, blending, feeding and carding. All such details are well known in the art and will not be discussed further herein.

After bonding of the cloth, or as a component step thereof, the web is patterned according to the teachings of the present invention to form raised and lowered regions. FIG. 3 illustrates two subsystems for performing this patterning, namely, a conveyor subsystem 40 and a cylinder subsystem 42, only one of which is typically actuated at any time. Each subsystem includes water jet nozzle arrangements and corresponding suction boxes, details of which are not shown here, as will be clear to one ordinarily skilled in the art. Various implementations of each of these subsystems will be described separately below with reference to FIGS. 4-6. After patterning, the web typically passes to a dewatering system 44 for removing a proportion of excess water from the web, followed by a drying system 46 which preferably performs both drying and heat treatment functions according to the teachings of the present invention. Finally, the web typically passes to a winding station 48 for winding and slitting to form rolls of a required size.

Figures 4A, 4B:
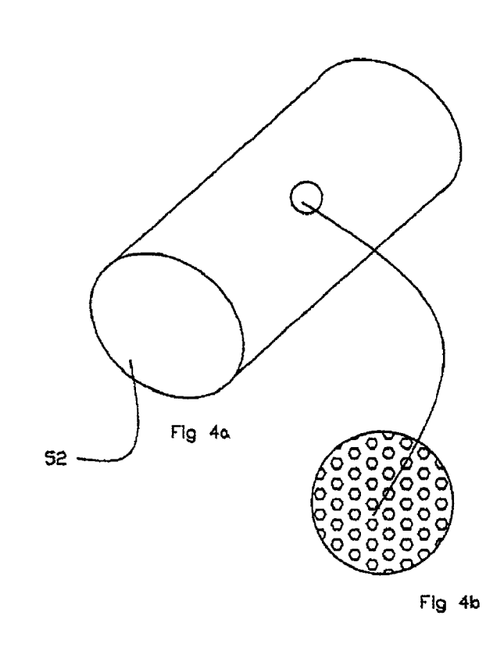
FIG. 4A is an isometric view of a cylinder for use in the production line of FIG. 3.
FIG. 4B is an enlarged view of a portion of the cylinder of FIG. 4A as indicated.
Figure 4C:
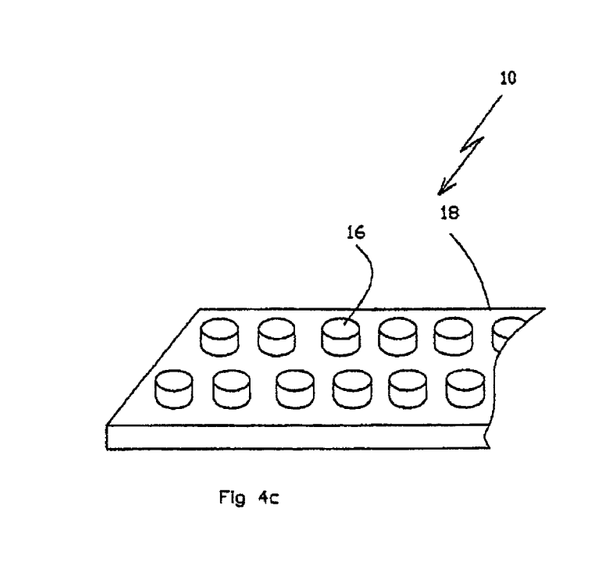
FIG. 4C is a schematic partially-cut-away isometric view of a non-woven abrasive cloth produced by use of the cylinder of FIG. 4A.

Referring now to particular preferred implementations of the patterning system, FIGS. 4A and 4B show a first implementation of a cylinder 50 for use in cylinder subsystem 42 where cylinder 50 is perforated with holes sufficient to allow entry of fiber portions, thereby forming a pattern of isolated projecting features 16 surrounded by lowered regions 18 as shown in FIG. 4C. Size of the perforations, and thus of the resulting raised projections, is typically in the range of 1-3 mm diameter, and the pitch (i.e. center-to-center nearest neighbor spacing) is typically at least 1 mm greater than the diameter, and typically not more than about 6 mm. As a result, for a hexagonally close packed layout (i.e. where all nearest neighbor spacings are equal) the open area of the perforations, and the corresponding resulting projections, generally account for from a few percent up to about 60 percent of the total surface area, with a particularly preferred range of about 20 to about 50 percent. In general, relatively large open area is advantageous for increased rates of production, but the diameter of each individual perforation must be limited to avoid damage to the quality of the resulting cloth. The "depth" or "height" of the resulting projections is determined by a combination of the perforations size and the parameters of the water entanglement processing, as is known in the art.

Figures 5A, 5B:
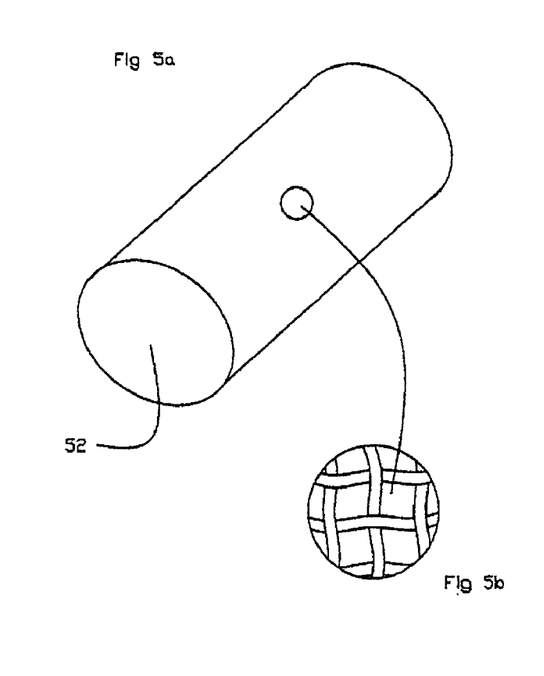
FIG. 5A is an isometric view of a cylinder for use in the production line of FIG. 3.
FIG. 5B is an enlarged view of a portion of the cylinder of FIG. 5A as indicated.
Figure 5C:
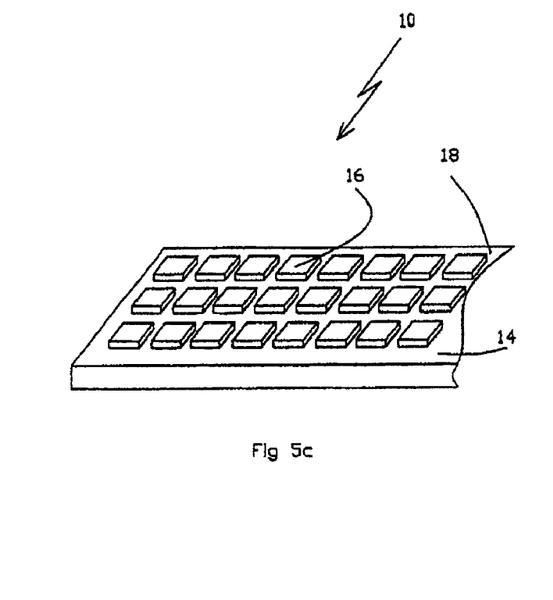
FIG. 5C is a schematic partially-cut-away isometric view of a non-woven abrasive cloth produced by use of the cylinder of FIG. 5A.

Turning now to FIGS. 5A and 5B, these show an alternative implementation of a cylinder 52 for use in cylinder subsystem 42 where cylinder 50 is formed with an open netting surface, thereby forming a pattern of isolated square or rectangular projecting features 16 surrounded by lowered regions 18 as shown in FIG. 5C. The netting surface can be implemented either by a netting layer overlaying a perforated cylinder, or by a cylinder formed directly from netting-type material. "Netting" in this context refers to any repetitive pattern with substantially polygonal, typically triangular or rectangular, openings. The structure may be formed from a woven arrangement of strands or strips, such as metal strands, or as a smooth surface with appropriately shaped perforations, for example of polymer materials. Typically, a stainless steel mesh is used. The size and spacing of the openings typically varies in a manner similar to that of the cylinder 50 discussed above. According to one particularly preferred example of a square netting pattern, the strands and the spaces have equal widths, such that the total open area of the net (and corresponding raised areas of the product) correspond to about 25% of the total surface area.

Figures 6A, 6B:
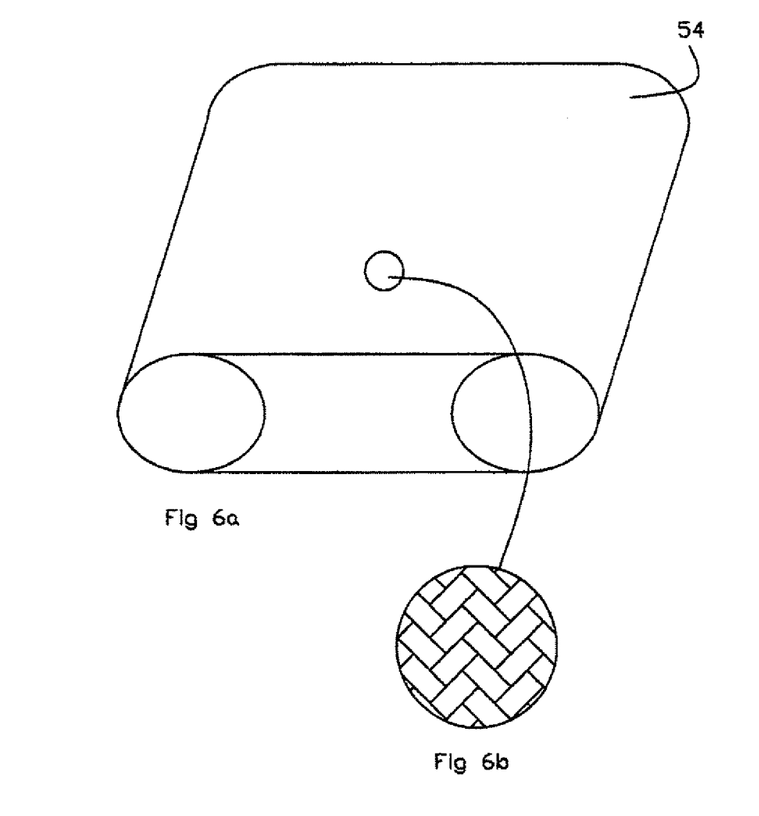
FIG. 6A is an isometric view of a conveyor belt for use in the production line of FIG. 3.
FIG. 6B is an enlarged view of a portion of the conveyor belt of FIG. 6A as indicated.
Figure 6C:
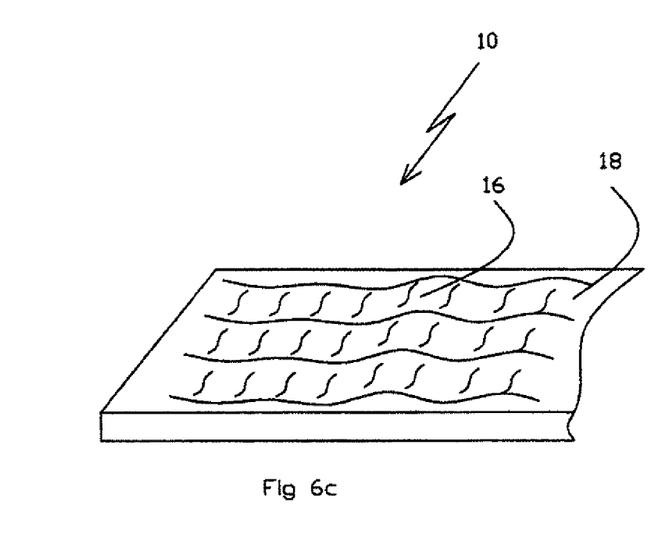
FIG. 6C is a schematic partially-cut-away isometric view of a non-woven abrasive cloth produced by use of the conveyor belt of FIG. 6A.

FIGS. 6A and 6B show a preferred implementation of a conveyor belt 54 for use in the conveyor belt subsystem 40 of FIG. 3. In this case, the conveyor belt is textured in order to impart a corresponding pattern to the surface of the non-woven web by physical processes equivalent to those described above with reference to cylinder subsystem 42. In the example shown here, the belt has a woven-fabric texture which imparts an undulating woven texture to the surface of the non-woven web as shown in FIG. 6C. The resulting texture is less aggressive in its abrasivity than the isolated projections of the previous implementations, rendering the product suitable for a range of lower-abrasivity applications such as personal hygiene and skin-care products. It will be noted, however, that conveyor belts with other types may be used to form patterns with a range of different textures, resulting in final products with differing degrees of abrasivity.

In each case of the conveyor belt or cylinder subsystem, one or more arrangement of water jets is directed towards the surface of the conveyor belt or cylinder so as to force the fibers into close engagement with the corresponding features of the underlying surface.

Figure 2C:
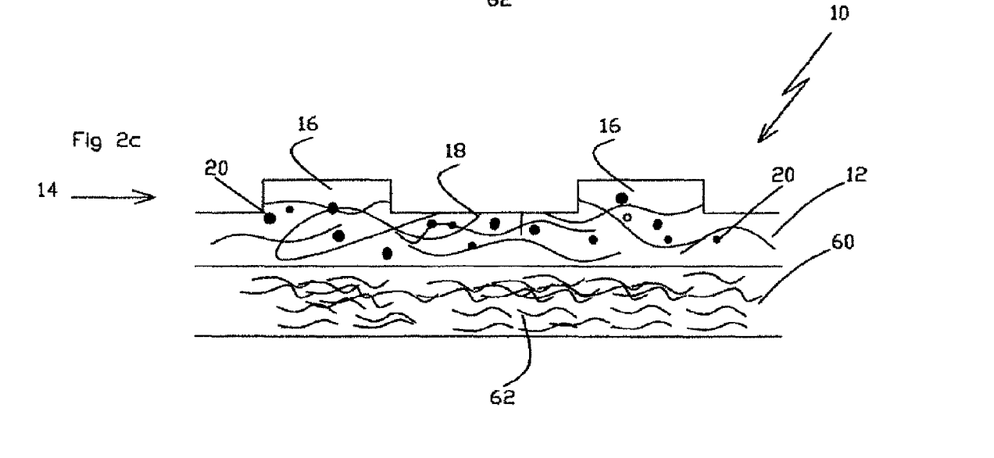

Turning now briefly back to FIGS. 2A-2C, it should be noted that particularly preferred implementations of the present invention employ a multi-layer web 10 made up from two or more layers where at least a second layer 60, and typically all layers other than layer 12, contains primarily fibers which do not form nodules or otherwise undergo physical structural changes under the heat treatment conditions used. Most preferably, layer 60 is made up substantially exclusively of fibers which do not significantly change their physical structure under the heat treatment conditions used. In this case, layer 12 is disposed facing the roller or conveyor belt of subsystems 40 and 42, while the additional layer or layers face the water jet nozzle arrangements 34. Layer 60 may be made up of any fiber or mix of fibers which is known for production of non-woven cloth, including various natural, synthetic and artificial fibers. Furthermore, it should be noted that layer 60 may include thermoplastic fibers with a transition temperature higher than that of the heat treatment conditions used for generating nodules in layer 12. Most preferably, layer 60 is formed primarily from fibers which impart softness and/or absorbent properties to the adjacent surface 62 of the web. For optimal fine quality and high opacity, fine gauge fibers of d-tex no more than 4.5 (denier of 4), and most preferably no more than 2.2 (denier 2), are used.

It should be noted that there is a profound synergy between the multi-layer implementation of the present invention and patterning techniques such as those described herein which generate migration of fibers within the web to form the required pattern. In other words, water from the water jets used in the patterning techniques described above drains through the web and the underlying cylinder or conveyor belt, carrying with it fibers which become lodged in the openings to form projections. This results in a net migration of fibers from the adjacent web to the "raised regions". This stands in contrast to stamping techniques used in certain other production techniques which merely squash part of the structure generating varying fiber density without migration of fibers.

Thus, according to a preferred multi-layer implementation of the present invention, the patterning process is performed so as to cause migration of at least a proportion, and preferably a majority, of the thermoplastic fibers within the layer 12 from lowered regions 18 to raised regions 16. This preferably results in a majority of the total material from layer 12 is located within raised regions 16 in the final product. This migration produces a structure such as in FIG. 2B where the nodule-forming fibers are concentrated in the raised regions for maximum contribution to the abrasive properties of the cloth while the main underlying structural component of the cloth is provided by the fibers of layer 60 which remain soft, flexible and absorbent after the heat-treatment. The result is a dual-function product in which one side provides abrasive properties while the opposite side has a soft absorbent high-quality non-woven cloth finish, and wherein the entire product maintains a highly flexible feel.

Parenthetically, it should be noted that both the primary water-entanglement process and the patterning processes described herein cause a small degree of mixing of fibers between the layers. In practice, this mixing has been found to correspond to no more than a few percent of the overall composition of each layer, and therefore does not significantly impact the bulk properties of the various layers.

Returning now to FIG. 3, as mentioned earlier, drying system 46 preferably performs both drying and heat treatment functions according to the teachings of the present invention. The operating temperature of the dryer is chosen to be near or above the transition temperature of the active polymer component of layer 12 and to maintain that temperature for slightly longer than is required to achieve drying of the web. The maximum temperature reached by the cloth after drying and the time period for which is it maintained at that temperature both affect the proportion of thermoplastic fibers which undergo changes in physical morphology and/or the extent of the changes which take place. By adjusting these parameters, as well as the depth of the embossing and the proportion of thermoplastic fibers in the layer, it is possible to achieve fine adjustment of both the level of abrasivity and the textural "feel" of the final product.

By way of a non-limiting example, the drying and heat treatment steps may be performed by an "air-through" dryer in which hot air is driven through the cloth as it passes over a cylinder or conveyor system. In this case, the dryer configuration is preferably arranged so that the embossed surface of layer 12 faces away from the cylinder or conveyor belt during this process in order to avoid mechanical contact with the embossed pattern during the heat treatment processing.

It should be noted that the present invention may be used to provide products for a wide range of different applications, ranging from very mildly abrasive products for personal hygiene or cosmetic applications up to cleaning pads for scouring household surfaces. In applications where a soft, absorbent texture is required, the proportion of thermoplastic fibers used in layer 12 is preferably below about 50%. For other applications where greater abrasion is required, proportions in excess of 50% may be preferred. In both cases, additional absorbency and a "soft" rear surface may be provided by additional layer(s) 60 if desired. In the case of a cleaning pad, this may provide a reversible scouring-and-wiping product.

Finally, it should also be noted that the functionality of the resulting product may optionally be enhanced by impregnation with various additives, finishing agents or cleaning agents, according to the intended use. Thus, a make-up removal pad may be impregnated with a make-up solvent and/or skin-conditioning agent, while a scouring pad may be impregnated with detergent or the like.

It will be appreciated that the above descriptions are intended only to serve as examples, and that many other embodiments are possible within the scope of the present invention as defined in the appended claims.

What is claimed is:

1. A method for producing abrasive non-woven cloth comprising:
   (a) forming a non-woven web of fibers including at least a first layer adjacent to a first surface of the web containing at least about 5% by weight of thermoplastic fibers;
   (b) processing the web by use of water jets so as,
      (i) to cause water entanglement of the fibers to form a cloth, and
      (ii) to generate a pattern of raised regions and lowered regions in said first surface; and
   (c) heating said cloth sufficiently;
      (i) to dry the water entangled cloth, and
      (ii) to cause at least part of said thermoplastic fibers to undergo changes in physical morphology, thereby imparting abrasive properties to at least said raised regions of said first surface.

2. The method of claim 1, wherein said forming a non-woven web of fibers further includes forming a second layer of fibers adjacent to a second surface of the web, said second layer having a composition different from a composition of said first layer, and wherein said processing of the web by use of water jets is implemented so as to cause water entanglement to form a cloth including layers corresponding to said first and second layers of fibers.

3. The method of claim 2, wherein said second layer contains primarily fibers which do not undergo changes in physical morphology under said heat treatment.

4. The method of claim 3, wherein said processing is implemented so as to cause migration of at least a proportion of fibers within said first layer from said lowered regions to said raised regions.

5. The method of claim 3, wherein said processing is implemented so as to cause migration of a majority of fibers making up said first layer in said lowered regions to said raised regions.

6. The method of claim 1, wherein said water jets are directed towards a portion of said web passing over a cylinder with a perforated surface.

7. The method of claim 1, wherein said water jets are directed towards a portion of said web passing over a cylinder with a netting surface.

8. The method of claim 1, wherein said water jets are directed towards a portion of said web passing along a patterned conveyor belt.

9. The method of claim 1, wherein said processing is implemented such that said raised regions include a plurality of isolated projecting features surrounded by said lowered regions.

10. The method of claim 1, wherein said processing is implemented such that said raised regions include a plurality of elongated ridges.

11. The method of claim 1, wherein said thermoplastic fibers have a weight of no more than about 45 grams per 10,000 meters.

12. The method of claim 1, wherein said thermoplastic fibers have a weight of no more than about 22 grams per 10,000 meters.

13. The method of claim 1, wherein said first layer contains at least about 10% by weight of said thermoplastic fibers.

14. The method of claim 1, wherein said first layer contains less than about 50% by weight of said thermoplastic fibers.

15. The method of claim 1, wherein said first layer contains more than about 50% by weight of said thermoplastic fibers.

* * * * *

UNITED STATES PATENT AND TRADEMARK OFFICE
CERTIFICATE OF CORRECTION

PATENT NO. : 7,384,591 B2 Page 1 of 1
APPLICATION NO. : 10/825287
DATED : August 1, 2008
INVENTOR(S) : Berenstein et al.

It is certified that error appears in the above-identified patent and that said Letters Patent is hereby corrected as shown below:

Claim 12, col. 10 should be corrected as follows:

Line 6: change "22" to --2.2--

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,384,591 B2 Page 1 of 1
APPLICATION NO. : 10/825287
DATED : June 10, 2008
INVENTOR(S) : Berenstein et al.

It is certified that error appears in the above-identified patent and that said Letters Patent is hereby corrected as shown below:

Claim 12, col. 10 should be corrected as follows:

Line 6: change "22" to --2.2--

This certificate supersedes the Certificate of Correction issued September 2, 2008.

Signed and Sealed this

Thirtieth Day of September, 2008

JON W. DUDAS
*Director of the United States Patent and Trademark Office*